(12) United States Patent
Knight et al.

(10) Patent No.: US 6,444,864 B1
(45) Date of Patent: Sep. 3, 2002

(54) THERMAL PLASMA PROCESS FOR RECOVERING MONOMERS AND HIGH VALUE CARBONS FROM POLYMERIC MATERIALS

(75) Inventors: Richard Knight, Philadelphia; Elihu D. Grossmann, Narberth; Ravikishan R. Guddeti, Philadelphia, all of PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 09/588,821

(22) Filed: Jun. 7, 2000

Related U.S. Application Data

(60) Provisional application No. 60/137,848, filed on Jun. 7, 1999.

(51) Int. Cl.$^7$ .............................. C10G 1/10; C07C 4/02
(52) U.S. Cl. ....................................... 585/241; 585/648
(58) Field of Search ................................ 585/241, 921, 585/648, 649, 650

(56) References Cited

U.S. PATENT DOCUMENTS 5,264,640 A * 11/1993 Platz ........................ 585/241

OTHER PUBLICATIONS

Baum, R., "Carbon Nanotube Syntheses" C&EN, 11–12; 1998.

Boulos, M.I., "Thermal Plasma Processing", IEEE Trans. Plasma Sci. 19(6):1078–1089; 1991.

Breitbarth et al., "Investigation of the Low–Pressure Plasma–chemical Conversion of Fluorocarbon Waste Gases", Plasma Chem. Plasma Proc. 17(1): 39–57; 1997.

Munz, R.J and Chen, G.Q., "Vitrification of Nuclear Waste in a Transferred ARC Plasma Melter", J. Nucl. Mater. 161: 140–147; 1989.

Sekiguchi et al., "Thermal Plasma Decomposition of Chlorofluorocarbons", Plasma Chem. Plasma Proc. 13(3): 463–478; 1993.

Tock, R.W. and Ethington, D., "Transfer Plasmas Destroy PCB Fluids", Chem. Eng. Comm. 71: 177–187; 1988.

\* cited by examiner

*Primary Examiner*—Thuan D. Dang
(74) *Attorney, Agent, or Firm*—Licata & Tyrrell P.C.

(57) ABSTRACT

The present invention relates to a method of recycling polymeric waste products into monomers and high value forms of carbon by pyrolytic conversion using an induction coupled RF plasma heated reactor.

3 Claims, No Drawings

THERMAL PLASMA PROCESS FOR RECOVERING MONOMERS AND HIGH VALUE CARBONS FROM POLYMERIC MATERIALS

INTRODUCTION

This application claims the benefit of U.S. provisional application Serial No. 60/137,848, filed Jun. 7, 1999.

This invention was supported in part by funds from the U.S. government (Department of Energy, Grant No. DE-FG02-97ER12205) and the U.S. government may therefore have certain rights in the invention.

BACKGROUND OF THE INVENTION

Today's society uses and quickly discards a large volume of an increasingly diverse range of polymeric materials. According to a recent EPA report, in 1997 "plastics" accounted for 9.4% by weight ($19.8 \times 10^6$ tons) of the total municipal solid waste (MSW) generated in the United States (Environmental Protection Agency, "Characterization of Municipal Waste: 1997 update, EPA Report 530-R-98-007, Franklin Assoc. Ltd., Prairie Village, Kans., May (1998)). Of this, only 5.3% ($1.1 \times 10^6$ tons) is recycled into low-grade applications such as synthetic lumber for park benches. The rest is either incinerated or landfilled. However, incineration is generally associated with the generation of $NO_x$ and other hazardous emissions while the cost of landfilling in many areas now exceeds $100/ton due to tighter federal and state regulations and decreases in the available land. Further, polymers from petrochemical sources have a very slow rate of biodegradation. Thus, the need to recycle MSW plastics is becoming increasingly important.

Most conventional chemical methods cannot deal with MSW due to the diversity of its composition, which ranges from single thermoplastics to complex thermosets and composites.

Thermal plasma processing of mixed industrial waste streams containing metallic, inorganic or organic components have been reported (Montgomery, R. W. Proc. 11th Intl. Symp. Plasma Chem. (ISPC-11), IUPAC, Loughborough, UK, August 22–27, Vol. 2, 526–530 (1993); Taylor, P. R. and Pirzada, S. A. Adv. Performance Mater. 1, 35–50 (1994); and Hoffelner, W. and Funfschilling, M. R. Proc. Workshop on Ind. Appl. of Plasma Chem., 12th Intl Symp. Plasma Chem. (ISPC-12), IUPAC, Minneapolis, Minn., August 25–26, Vol. B. Thermal Plastic Applications, 3–7 (1995)). These processes generate both solid (metal +slag) and gaseous product streams. Gaseous product streams are typically in the form of "syn-gas" which is a mixture of CO and $H_2$ usable as a fuel or as a precursor for organic syntheses. The thermal plasma gasification of particulate coal and processing of methane gas have also been reported for the synthesis of acetylene (Gannon, R. E. Ind. Eng. Chem. Prod. Res. Develop. 9(3), 343–347 (1970)). Further, thermal plasma destruction of toxic chemicals such as PCBs and $CCl_4$ have been disclosed (Smith et al. Proc. 3rd Euro. Cong. Thermal Plasma Process (TPP-3), VDI, Aachen, Germany, September 19–21, 667–674 (1994); Tock, R. W. and Ethington, D. Chem. Eng. Comm. 71, 177–187 (1988); Han et al. J. Mater. Synth. Process 1(1), 25–32 (1993); Lachmann et al. Proc. 3rd Euro. Cong. Thermal Plasma Process (TPP-3), VDI, Aachen, Germany, September 19–21, 591–597 (1994); Mosse, A. and Kusnetov, G. Proc. 3rd Euro Cong. Thermal Plasma Process (TPP-3), VDI, Aachen, Germany, September 19–21, 651–657 (1994); Breitbarch et al. Plasma Chem. Plasma Proc. 17(1), 39–57 (1997); and Sekiguchi et al. Plasma Chem. Plasma Process 13(3), 463–478 (1993)). In addition, thermal plasma vitrification of high and low level nuclear waste has been reported as a means of reducing the volume of the waste and of encapsulating it in a non-leachable matrix prior to burial/storage (Hoffelner, W. and Funfschilling, M. R. Proc.

Workshop on Ind. Appl. of Plasma Chem., 12th Intl Symp. Plasma Chem. (ISPC-12), IUPAC, Minneapolis, Minn., August 25–26, Vol. B. Thermal Plastic Applications, 3–7 (1995)); Girold et al. Thermal Plasma for Hazardous Waste Treatment, Benocci et al. eds. World Scientific, Singapore, 160–168 (1996); Munz, R. J and Chen, G. Q. J. Nucl. Mater. 161, 140–147 (1989); and Hoffelner et al. Thermal Plasmas for Hazardous Waste Treatment, Benocci et al. eds. World Scientific, Singapore, 126–145 (1996)). The primary advantage of thermal plasma processes over other technologies is their ability to process solid, liquid and gaseous materials, rapid thermal response and quenching, and low off-gas emission compared with combustion-driven incinerators.

Thermal plasmas can be generated by direct current (DC) or alternating current (AC) arc/plasma systems utilizing either consumable or non-consumable electrodes or by electrodeless radio frequency induction-coupled plasma systems (ICP) (Fauchias et al. in Thermal Plasma for Hazardous Waste Treatment, Benocci et al. eds, World Scientific, Singapore, 1–38 (1996)). The majority of thermal plasma/waste processes developed have used DC plasma generators.

However, DC thermal plasma systems for waste treatment are limited in applicability for several reasons. First, DC plasma systems generally suffer from electrode erosion and product contamination from electrode erosion. Second, scale-up is limited by electrode erosion, and until fairly recently by power supply technology. Finally, the control of the process chemistry is difficult in DC systems since generally only inert, nonoxidizing plasma forming gases can be used. Thus, the importance of ICP systems is beginning to be recognized (Smith et al. Proc. 3rd Euro Cong. Thermal Plasma Process (TPP-3), VDI, Aachen, Germany, September 19–21, 667–674 (1994); Huhn et al. Pract. Period Hazardous Toxic and Radioactive Waste Management , 107–117, July (1997); Boulos Proc. Workshop on Ind. Appl. of Plasma Chem., 12th Intl Symp. on Plasma Chem. (ISPC-12), IUPAC, Minneapolis, Minn., August 25–26, Vol. B, Thermal Plasma Applications, 89–95 (1995); Boulos, M.I. IEEE Trans. Plasma Sci. 19(6), 1078–1089 (1991)).

The focus of thermal plasma technologies has been on destruction of hazardous chemical wastes such as chlorinated and fluorinated hydrocarbons, the extraction of metals from industrial waste, volume reduction/vitrification of nuclear waste and the destruction of military waste.

In the present invention, a method is provided for recovering monomers and high value carbons from polymeric wastes using a thermal plasma treatment process.

SUMMARY OF THE INVENTION

An object of the present invention is to provide a method of recovering monomers and high value carbons such as carbon nanotubes and Fullerenes from polymeric wastes using an RF induction-coupled thermal plasma heated reactor operating close to atmospheric pressure. In this method, powders of polymeric wastes are injected into an induction coupled RF plasma heated reactor wherein the polymeric waste powders are pyrolytically converted to monomers and high value forms of carbons. These monomers and high value forms of carbons are then recovered from the reactor.

DETAILED DESCRIPTION OF THE INVENTION

A significant, valuable percentage of today's municipal solid waste stream is polymeric materials. In fact, typical polymeric municipal solid waste comprises approximately 25.36% polyethylene (LDPE/LLDPE), 20.85% polyethylene (HDPE), 13.06% polypropylene (PP), 10.07% polystyrene, 8.61% polyethylene terepthalate (PET), 6.23% polyvinyl chloride (PVC) and 15.84% other materials. This polymeric waste is generally incinerated, landfilled or recycled via downgraded usage as economic recycling technologies have not been available.

In the present invention, however, an induction coupled RF plasma heated reactor is used for the pyrolytic conversion of olymeric materials to monomers and high value carbon forms including, but not limited to Fullerenes, including carbon nanotubes. It has now been found that a powder of waste polymers can be converted to monomers by injecting the powder axially into the center of a plasma, preferably an argon plasma. Specifically, the methodology of the present invention converts powdered polymeric materials into high levels of ethylene and/or propylene. Analysis of the gaseous product stream of the reactor demonstrated that using the method of the present invention, high levels of ethylene and propylene were obtained, together with lesser amounts of hydrocarbons including, but not limited to, methane, acetylene and 1,3-butadiene. Typically, approximately 50% conversion of the solid feedstock for polyethylene and 75% conversion of the solid feedstock for polypropylene was obtained.

Further, some solid carbonaceous residues were also produced and collected in the reactor during operation. Analysis of these residues showed the presence of carbon nanotubes, one example of the family of novel, high value, carbon forms ,Fullerenes.

Fullerenes are commonly produced via thermal plasma synthesis using an electric arc discharge between carbon electrodes in a helium atmosphere. Glow and arc plasmas, generally of the direct current (DC) type, have also been described for the synthesis of Fullerenes, including nanotubes (Wilson, E. C&EN, page 11–12, Nov. 9, 1998).

Nanotubes were first discovered less than a decade ago. They are typically synthesized by various vapor decomposition processes, including the catalytic decomposition of acetylene in nitrogen at temperatures above 700° C., and the plasma-enhanced chemical vapor deposition (PE-CVD) from acetylene in ammonia. The production of single-walled carbon nanotubes by a chemical vapor deposition (CVD) process has been disclosed as a means for incorporating nanotubes into conventional microstructures (Baum, R. C&EN, page 11, Nov. 9, 1998). CVD techniques typically operate at low pressures, thus requiring complex vacuum systems. These systems are also limited in both throughput and scale-up.

In the present invention, however, high value novel forms of carbon are produced via atmospheric pressure thermal plasma synthesis from polymeric waste products. Thus, the method of the present invention provides an environmentally friendly alternative to polymeric waste recycling as compared to landfilling and/or incineration and a useful method for production of novel, high value carbon products, including, but not limited to, Fullerenes.

In this method, polymeric waste products are first made into powders. In a preferred embodiment, the powders comprise free flowing particles. Thus, particles having a spherical morphology are preferred. Particle size is dependent upon the apparatus being used. In experiments described herein, powders comprising particles approximately 5 to 90 $\mu$m were used. After grinding or chopping of the polymeric waste products, it is preferred that resulting powders be seived or screened prior to introduction into the reactor so that particles in the powder are within a selected size distribution. The powders are then introduced into an induction coupled RF plasma heated reactor wherein the polymeric wastes are pyrolytically converted to monomers and high value forms of carbon. These monomers and high value forms of carbon are then recovered from the reactor.

A series of experiments were conducted to understand the reaction mechanisms involved in the plasma conversion of waste polymers back into monomers and other useful compounds including carbon nanotubes via the method of the present invention. The key process parameters believed to be most important to the yield of monomers are listed in the following Table 1, along with optimal values determined from experiments with polyethylene (PE) and polypropylene (PP).

TABLE 1

Process Parameters for Plasma Conversion of Waste Polymers

| Parameter | Range | Optimum for PE | Optimum for PP |
|---|---|---|---|
| Plasma Plate Power (kVA) | 10–20 | 10 | 20 |
| Sheath gas flow rate (slm) | 40–60 | 40 | 40 |
| Central gas flow rate (slm) | 15–40 | 40 | 15 |
| Quench gas flow rate (slm) | 0–155 | 0 | 0 |
| Probe gas flow rate (slm) | 7–9 | 9 | 9 |
| Powder feed rate (g/min) | 1.5–5 | 5 | 1.5 |
| Probe location | 115 mm from rear of torch | not varied | not varied |
| Reactor pressure (atm) | ~1 | ~1 | ~1 |
| Mean particle size ($\mu$m) | PE:63 (20–90) PP:30 (5–90) | 63 | 30 |
| Quench nozzle | | not varied | not varied |
| Quench nozzle location | Position A (FIG. 3) | not varied | not varied |
| Quench gas | Argon | Argon | Argon |
| Plasma Gas | Argon | Argon | Argon |

A two level factorial experimental matrix was designed using a statistical software package (DESIGN-EASE™) to determine the principal parameters affecting the yield of products. Only the first 6 parameters in Table 1 were considered in this analysis. Eight experiments were required to study the effects of all 6 parameters and 8 more were needed to separate the main effects from interactions.

From the initial set of experiments, as analyzed using DESIGN-EASE™, the standardized effect of each parameter plus their interactions on the amount of ethylene and propylene produced was obtained. A plot of standardized effect versus normal probability showed a straight line through most of the points. For proper use of a normal probability plot, the effects must have a common error variance. Missing data or altered independent factors can cause the variance associated with the estimated effects to differ. The effects must therefore be standardized to correct for this (Box, G.E.P., Hunter, W. G. and Hunter, J. S. Statistics for Experimenters: An Introduction to Design, Data Analysis and Model Building, John Wiley & Sons, NY (1978)). Standardized effects were computed using DESIGN-EASE™ in conjunction with the following equation, wherein A represent the first variable considered:

$$\text{Standardized Effect}_j = (\text{Coefficient}_i)\,(2)\,(\text{Std. Error}_A/\text{Std. Error}_i)$$

Those factors which were significantly off the line were the variables of statistical importance. These were: plasma plate power input, central gas flow rate, probe gas flow rate, power feed rate, and interaction between the plasma plate power and quench gas flow rate. Even though the plot indicated that the latter variable was not very significant, it was chosen in order to study the interaction. System constraints limited the range of flow for the probe gas, so the optimum value determined during preliminary runs was used and kept constant in subsequent experiments.

The influence of plasma power plate input over the range from 10 kVA to 20 kVA on the production of ethylene was determined. There was a small reduction in the ethylene concentration at the higher power level. Because power level also interacted with other variables, no generalization can be made for this results. However, by plotting the data, it was deduced that at the higher plasma plate power level more quench gas was required to produce ethylene. This indicated that the higher average temperature of the plasma region, when less quench gas was used, favored the production of other species such as propylene. Similar analysis of other parameters led to the choices for optimal values for the variables set forth in Table 1.

The gaseous products were mostly mixtures of propylene and ethylene, together with small fractions of other hydrocarbons, such as methane, acetylene and 1,3-butadiene. Product distribution for the optimum case conditions is listed in Table 2.

TABLE 2

Product Distribution at Optimal Conditions

| Product | Concentration (%) in PE | Concentration (%) in PP |
|---|---|---|
| Propylene | 53 | 93.7 |
| Ethylene | 22 | 1.7 |
| Methane | 5.6 | 2.6 |
| Acetylene | 5.7 | 0 |
| Butanes & Butenes | 3.7 (1,3-butadiene) | 1.3 |
| Solid residue | ~50 | ~23 |

Although ethylene concentration was the parameter used for optimizing the variables in polyethylene recycling, propylene was also present in the product gases by a factor of 2.4 times greater than for ethylene. In polypropylene recycling, propylene was present in the product gases by a factor of 30.3 times greater than for ethylene. For polyethylene, other hydrocarbons were present to a lesser extent (10% to 25% of ethylene) For polypropylene, other hydrocarbons were present at similar concentrations to ethylene. The total concentration of hydrocarbons listed in Table 2 on an argon free basis for polyethylene was 90% which indicated that there were other products such as hydrocarbons and hydrogen not detected by the gas chromatography analysis.

Variations in concentration of ethylene and propylene with plasma plate power were also determined. For polyethylene recycling, it was found that ethylene concentration decreased from 22% to 10% when the power was increased from 10 kVA to 20 KVA; propylene concentration increased over the same power range from 53% to 78%. Methane concentration decreased at a slower rate. For polypropylene recycling, increased power had little effect on concentrations of monomers recovered.

Variations in the products as the central gas flow rate of argon increased from 15 to 40 slm were also determined for polyethylene recycling. It was found that ethylene concentration increased by 37.4% over the flow range studied. An increased scatter in the data, believed to be caused by turbulence in the plasma zone, was observed. This is indicative of a shorter residence time in the plasma regions and a greater variation in the effective temperature. A small increase in methane concentration was also observed. Acetylene increased from about 0.8% at 15 slm to 5.4% at 40 slm. The 1,3-butadiene increased from 1.5% at the lower flow to 2.5% at the higher flow. The decrease in the propylene/ethylene ratio also indicated a lower average plasma temperature. Propylene concentration was also observed to decrease from 71.2% to 51.7% over the same range of variation in central gas flow rate.

The influence of quench gas flow rate was also determined. In polyethylene recycling, as the quench flow rate varied from zero to 155 slm, the ethylene concentration peaked at 23.2% at a quench flow rate of 29 slm. Again there was greater scatter in the data at the higher quench flow rates, indicating that increased turbulence led to variations in the average temperature. Similar trends were observed in polypropylene recycling.

The ratio of quench gas flow rate to the sum of sheath, central and probe gas flow rates was a maximum of 1.75. The quench gas flow rate thus did not affect the structure of the plasma to a significant extent. It only affected the tail flame of the plasma zone. Ethylene concentration decreased with the increase in the quench gas flow rate. This indicated that the ethylene was mainly produced in the plasma tail flame region, which was most affected by the quench gas. The maxima in the ethylene concentration curve at low quench gas flow rates could have been due to quenching of any secondary reactions occurring in the hot gases exiting the plasma zone.

To determine whether the quench velocity rather than the total gas flow was the controlling variable, quench nozzles of different orifice diameters were used. As the velocity of the quench gas was increased by decreasing the nozzle orifice diameter, the flow rate at which maximum ethylene concentration occurred decreased.

PE particle feed rate was varied from 1.5 to 5.0 grams/minute. The ethylene concentration approximately doubled from 11.97% to 22.24% as the feed rate increased from minimum to maximum. Concomitant to the ethylene production, the solids recovered from the reactor increased from 15% of those fed at the 1.5 gram/minute level to 50% at the 5 gram/minute level of feed.

Transmission electron microscopy (TEM) analysis of the solid material recovered from recycling of both polyethylene and polypropylene indicated a range of carbon structures, from highly oriented crystalline structures through turbostratic to completely amorphous. Carbon nanotubes were also detected, thus indicating that, not only is this process useful in the recycling of polymeric or hydrocarbon feedstocks but also in the production of high value carbon materials from these feedstocks.

The following nonlimiting examples are provided to further illustrate the present invention.

EXAMPLES

A Tekna (Model No. PL-35) ICP torch was used to generate the plasma jet used in the study of polyethylene depolymerization. By inducing an oscillating electromagnetic field in a flowing gas, the ICP torch ionizes the gas, which generates an extremely hot (8,000–10,000 K) plasma jet at atmospheric pressure. This torch is described by Boulos, M. I. Proc. Workshop on Ind. Appl of Plasma Chem. 12th Intl. Symp. on Plasma Chem. (ISPC-12) IUPAC, Minneapolis, Minn., August 25–15 26, Vol. B., Thermal Plasma Applications, 89–95 (1995). The reactor was designed to enable rapid reactant heating and quenching. In this prototype reactor, pressure was controlled by air driven venturi pumps (eductors). However, other means for control of pressure can be used. These means also ensure sufficient dilution and cooling of off-gas stream.

UHMW PE (Mol. Wt.=30,000 kg/kmol) obtained from Ticona, LLC. was used as feedstock. The particle size ranged from 20 µm to 90 µm (mean size=63 µm) as determined by a laser scattering particle size distribution analyzer (Horiba, Ltd. Model No. LA910). The particles were either spherical or angular in morphology. The PE powder was fluidized in a flow of argon carrier gas and fed into the center of the ICP torch via a water-cooled stainless steel probe, using a slotted rotating disk type volumetric feeder (Plasmadyne, Model No. 1252B).

The high temperature plasma jet leaving the torch was quenched by an argon gas jet approximately at room temperature. A full-cone, wide-angle nozzle (Spraying Systems, Inc., 1/8 GA 316SS-8W) was located so that the quench gas flow directly opposed the plasma gas flow. The stainless steel nozzle had an orifice diameter of 2.381 mm. The nozzle was designed for a flow of 71.6 slm of argon gas at an inlet pressure of 0.69 kPa (10 psi). Based on initial results, it was believed that quenching the hotter regions of the plasma jet tail flame would increase the ethylene concentration in the product gas. An identical quench nozzle was located with the flow of quench gas directed perpendicular to the plasma stream. The gas flow rate through these nozzles was controlled using critical orifices for flow rates up to 80 slm and 60 slpm and above, respectively.

A nominally 3.175 mm (1/8" internal diameter) stainless steel sampling tube, connected to a diaphragm pump, was used to withdraw gas samples from the reactor. Samples were collected in Tedlar gas sample bags (Supelco Co., Part No. 24634). The sample bags were filled once, evacuated and refilled to ensure sufficient dilution of residual air. Samples were later analyzed off-line using a gas chromatograph (GC) (Shimadzu, GC-14A), fitted with a 23% sp-1700 on 80% chromosorb PAW column (Supelco Co., Part No. 12809-U).

What is claimed is:

1. A method of recycling polymeric materials into monomers and high value forms of carbon comprising:

(a) injecting a powder of polymeric materials comprising polyethylene, polypropylene, polystyrene, polyethylene terepthalate, or polyvinyl chloride into an induction coupled RF plasma heated reactor so that the polymeric materials of the powder are pyrolytically converted to monomers and high value forms of carbons; and (b) isolating the monomers and high values forms of carbon from the reactor.

2. The method of claim 1 wherein the high value forms of carbon are Fullerenes.

3. The method of claim 2 wherein the Fullerenes are nanotubes.

* * * * *

UNITED STATES PATENT AND TRADEMARK OFFICE
CERTIFICATE OF CORRECTION

PATENT NO.    : 6,444,864 B1
DATED         : September 3, 2002
INVENTOR(S)   : Knight et al.

It is certified that error appears in the above-identified patent and that said Letters Patent is hereby corrected as shown below:

Column 3,
Line 16, please delete "olymeric" and insert -- polymeric --.

Column 8,
Line 16, please insert -- including Fullerenes -- following "carbon".

Signed and Sealed this

Thirtieth Day of December, 2003

JAMES E. ROGAN
*Director of the United States Patent and Trademark Office*